(No Model.) 2 Sheets—Sheet 1.
L. STOCKWELL.
DOUGH KNEADER.
No. 453,218. Patented June 2, 1891.
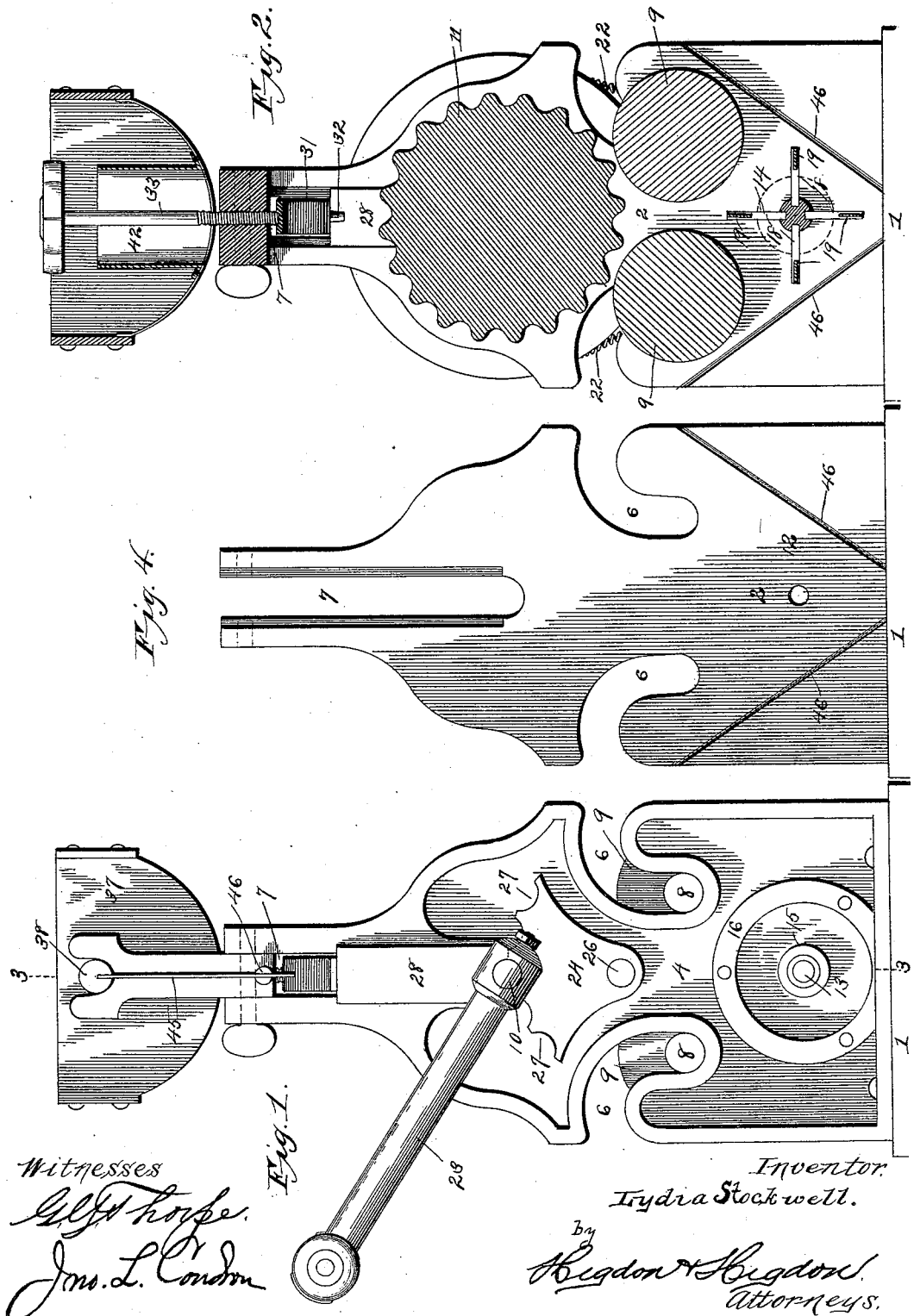
Witnesses
Inventor
Lydia Stockwell.
by
Higdon & Higdon
Attorneys.

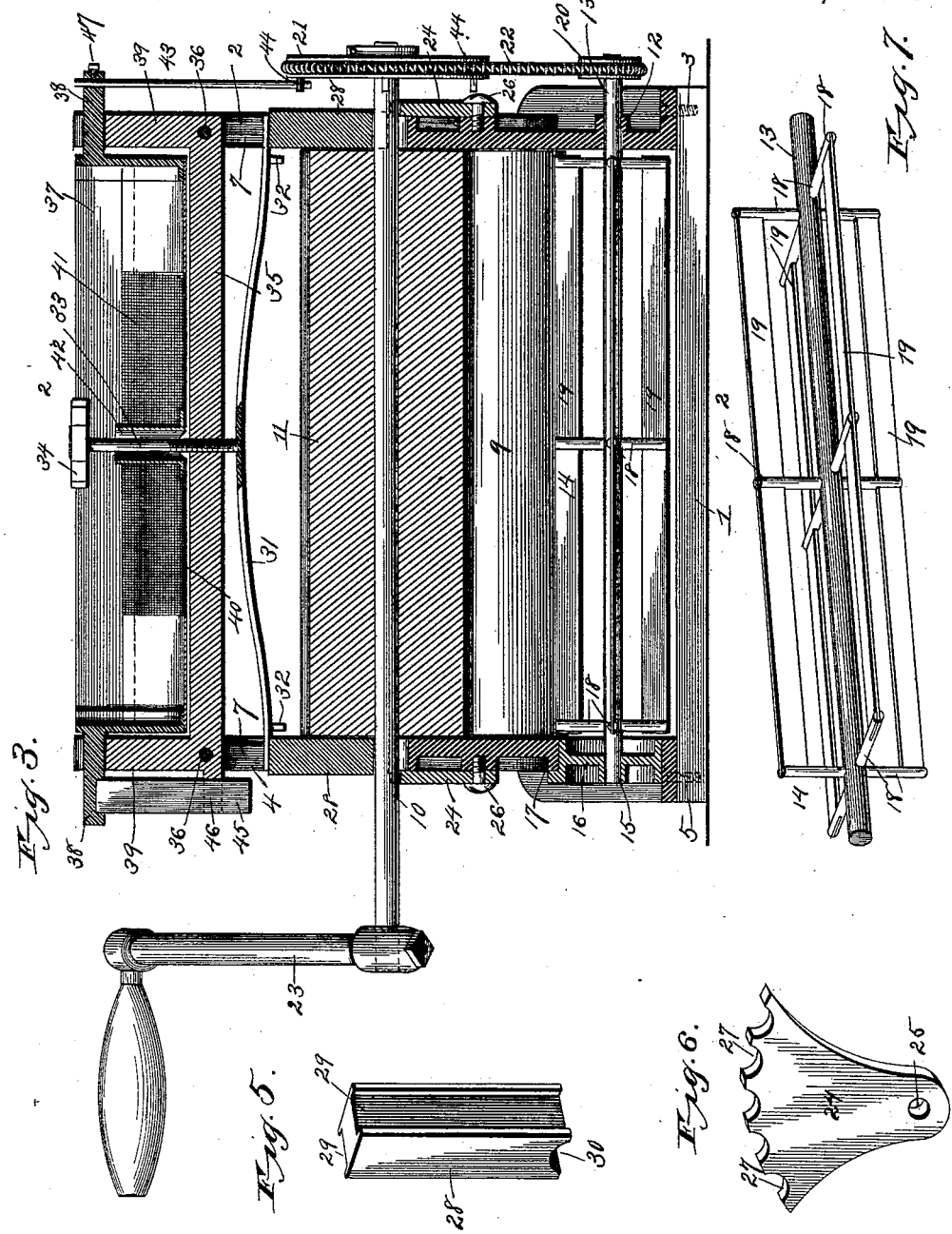

UNITED STATES PATENT OFFICE.

LYDIA STOCKWELL, OF ATCHISON, KANSAS.

DOUGH-KNEADER.

SPECIFICATION forming part of Letters Patent No. 453,218, dated June 2, 1891.

Application filed February 12, 1891. Serial No. 381,221. (No model.)

*To all whom it may concern:*

Be it known that I, LYDIA STOCKWELL, of Atchison, Atchison county, Kansas, have invented certain new and useful Improvements in Dough-Kneaders, of which the following is a full, clear, and exact description, reference being had to the accompanying drawings, forming a part hereof.

My invention relates to machines for kneading dough; and the objects of my invention are to produce a simple, inexpensive, and durable machine which shall be entirely automatic in its operation and which shall rapidly and thoroughly knead the dough and simultaneously dust the same with flour, so as to prevent the dough from sticking and clogging in the machine. Furthermore, to produce a machine which shall thoroughly aerate the flour used in dusting the dough, and thus insure the utmost lightness of the product.

To the above purposes my invention consists in certain peculiar and novel features of construction and arrangement, as hereinafter described, and pointed out in the appended claims.

In order that my invention may be fully understood, I will proceed to describe it with reference to the accompanying drawings, in which—

Figure 1 is an end elevation of my improved dough-kneader and duster. Fig. 2 is a transverse vertical section of the same on the line 2 2 of Fig. 3. Fig. 3 is a vertical longitudinal section of the same on the line 3 3 of Fig. 1. Fig. 4 is an end elevation of the supporting frame-work of the machine with the operative mechanism removed therefrom. Fig. 5 is a detached perspective view of one of the presser-blocks for the corrugated roll-shaft. Fig. 6 is a detached perspective view of one of the notched supports for the corrugated roll-shaft. Fig. 7 is a detached perspective view of the dusting-reel.

In the said drawings, 1 designates the base of the machine, said base being of oblong rectangular form and arranged to extend horizontally when the machine is in use. From one end of this base rises a vertical end frame or standard 2, the lower end of which is attached to the base by a suitable number of screws, bolts, or similar devices 3, while at the opposite end of the base 1 is placed a vertical end frame or standard 4, which is similar in form to the standard 2, and the lower end of which is secured to the base by screws, bolts, or similar devices 5. Both the standards 2 and 4 are formed about midway of their height with two oppositely-disposed recesses 6, which extend inwardly and downwardly, and the upper ends of which open out of the sides of the standards. The inner lower ends of these recesses constitute the bearings for the shafts 8 of two plain feeding-rolls 9, to be hereinafter more fully described.

The upper ends of the standards 2 and 4 are each formed with a long narrow vertical recess 7, which opens at its upper end through the upper extremity of the standard, and the lower end of which recess constitutes a receptacle for the axle 10 of the upper corrugated kneading-roll 11, to be hereinafter more fully described. The lower part of the standard 2 is also formed with an opening 12, which constitutes the bearing for the adjacent end of the axle 13 of the dusting-reel 14, also to be hereinafter more fully described, while the opposite end of said axle 13 finds its bearing 15 in an opening in the center of a circular bearing-plate 16, which is set removably in a corresponding opening 17 in the lower part of the standard 4. This opening 17 is of such diameter that when the bearing-plate 16 is removed therefrom the reel 14 can be inserted longitudinally into and withdrawn similarly out of the opening, the dusting-reel being thus rendered readily removable for cleaning when required. It will also be seen that the open character of the recesses 6 and 7, above described, render the rolls 9 and 11 likewise readily removable, so that the said rolls (as well as the reel) can be readily cleaned when desired.

The reel 14 is composed of any suitable number of radial arms 18, arranged in sets, (there being three sets of four arms each shown in the drawings,) and the corresponding arms of each set are connected by a longitudinal blade 19, there being thus four of such blades shown, but the precise number being variable, as desired. Upon one end of the axle 13 of this reel is mounted removably a pulley 20, while upon the corresponding end of the shaft 10 of the roll 11 is secured a larger pulley 21. A driving-belt 22 runs over the pulley 21 and under the pulley 20 and transmits power from the roll 11 to the reel 14. The roll 11 is revolved by hand or other power applied to a crank-arm 23, which is secured to the opposite end of the axle 10 from that which carries the pulley 21. The driving-belt 22 is preferably constructed of coiled spring-wire so as to be always entirely free from slack, and so also to exert a constant tension between the roll 11 and the reel 14, for a purpose to be hereinafter explained.

To the outer side of each standard 2 and 4 is secured a segmental bearing-plate 24, the lower end of each of which is formed with an eye or hole 25 to receive a screw or bolt or similar device 26, which enters the standard just below the end of the recess 7. The upper edge of each of these plates is formed or provided with a number of recesses 27, arranged in a segment of a circle, and the end portions of the axle 10 of roll 11 are set in one or the other corresponding notches or recesses 27 of the said plates 24, according as it is desired to increase or diminish the distance between the roll 11 and the lower rolls 9. Immediately above each of the said end portions of the axle 10 is placed a presser-block 28, which is of oblong rectangular form and the two opposite sides of which are formed with longitudinal guide recesses 29 to receive the sides of the recesses 7, and thus retain the blocks movably in said recesses. The lower end of each presser-block 28 is formed or provided with a concave recess 30 to receive the corresponding upper side of the end portion of the axle 10, and the upper ends of these blocks are pressed upon downwardly by the ends of a leaf-spring 31, as shown, to retain the axle 10 within the desired recesses 27 of the plates 24.

The spring 31 extends longitudinally of the machine immediately above the roll 11, and is formed near its extremities with downwardly-extending lugs or flanges 32, which lie adjacent to the inner sides of the upper ends of the presser-blocks 28, and thus insure the retention of said spring in position. This spring also curves upward from each end to its middle, at which latter point it receives the pressure of the lower end of a tension-screw 33. This screw carries at its upper end a hand-wheel 34, and its lower portion is threaded through the bottom of a frame 35, which is secured at its ends by pins 36 in the upper parts of the recesses 7. The arrangement is such that by turning the screw in one or the opposite direction the pressure of the spring 31 upon the blocks 28 is varied to accord with the position of the shaft in plates 24, and thus insure at all times a stronger or weaker pressure of the upper roll upon the dough. Immediately above the frame 35 is placed an oscillating or vibrating receptacle 37, which extends longitudinally of the machine, and at the ends of which are placed supporting-trunnions 38, which have bearings in the upper ends of standards 39 at the ends of the frame 35. This oscillating receptacle is designed to receive a quantity of dry flour and to deliver the same downward into the machine, and for this purpose a central elongated opening 40 is made in the bottom of the receptacle 37, through which the flour passes, and, falling over the side of the frame 35, is deposited upon the corrugated roll 11. A vertical wall 41, of wire-cloth or other suitable meshing, surrounds the opening 40 and prevents the entrance of any impurities into the machine, while a vertical tubular partition 42 is attached to the bottom of the receptacle and serves to prevent the entrance of flour around the screw 33. In order to insure the proper feeding of the dry flour from the receptacle 37, a rigid rod or arm 43 depends from one of the trunnions 38, and the lower end of this arm is struck laterally by two or more pins or studs 44 upon the inner side of the pulley 21, thus rocking or oscillating the receptacle upon its trunnions 38. The receptacle 37 is returned after each oscillation by a spring 45, the upper end of which is attached to the trunnion 38 opposite from that trunnion to which the rod or arm 43 is attached, and the lower end of which is embraced by a projection 46 on the adjacent end of frame 35. Thus an effective feed of the flour is produced, the flour being sifted through the meshing 41 and downward into the machine.

The dough is fed into one side of the machine between the rollers 11 and 9, the upper roller 11 insuring the proper progress as well as effecting the required kneading of the dough, and the lower rollers 9 supporting the dough and insuring its passage out of the machine. During this operation the upper surface of the dough is covered with flour from the receptacle 37, and all liability of the dough sticking or clogging upon the roller 11 is avoided.

Two inclined boards 46 are shown as removably inserted into the lower parts of the standards 2 and 4 and inclosing the reel 14 between them. These boards serve to retain a quantity of flour between them, and as the machine is operated the reel 14 throws quantities of this flour upward against the lower rollers 9 or the under surface of the dough, and thus prevents the latter from sticking or clogging in the rolls 9. In lieu of the boards 46 a shallow trough may be used, the entire machine being set directly within said box or trough.

From the above description it will be seen that I have produced a simple and durable form of machine, which is easily operated, and which serves to properly knead and dust the dough.

By reference to Fig. 3 it will be seen that the rod or arm 43 passes at its upper end adjustably through the outer end of the trunnion 38, and that said rod is held in position by a set-screw 47, which is threaded into the outer end of the trunnion. Thus by varying the position of the rod or arm 43 in the trunnion 38 its lower portion can be brought into more or less extensive contact with the pins or studs 44, and consequently a more or less extensive oscillation of the receptacle 37 can be produced. If desired, the rod or arm 43 can be set upward, so that its lower end will not engage the pins or studs 44, and consequently no oscillation of the receptacle will occur.

I desire it to be understood that I contemplate arranging a number of these machines in series and passing the dough successively through said machines, thus avoiding the necessity of returning the dough repeatedly through the same machine. I also desire it to be understood that in the small type of hand-machines the reel and the movable bearing-plates may be dispensed with, if desired, thereby greatly simplifying the construction of the machine.

Having thus described my invention, what I claim as new therein, and desire to secure by Letters Patent, is—

1. An improved dough-kneading machine comprising a system of kneading-rolls, a dusting-reel, and a retractible tension-belt connecting one of the rolls with the reel, substantially as set forth.

2. An improved dough-kneading machine comprising a kneading-roll, movable recessed bearing-plates for said roll, removable presser-blocks, also for said roll, and a variable presser-spring acting upon said blocks, substantially as set forth.

3. An improved dough-kneading machine comprising a kneading-roll, an oscillating dusting-receptacle located above said roll, an adjustable rod or swinging arm pendent from said receptacle and engaging striking-pins carried by a pulley connected to the roll, and a spring carried by the receptacle and attached immovably to the machine-frame, substantially as set forth.

4. An improved dough-kneading machine comprising an oscillating dusting-receptacle, a kneading-roll, a tension-screw for bearing upon said roll, and a tubular guard-frame attached to the bottom of the receptacle and surrounding said screw, substantially as set forth.

In testimony whereof I affix my signature in presence of two witnesses.

LYDIA STOCKWELL.

Witnesses:
JNO. L. CONDON,
Mrs. JERRY BROWN.